United States Patent [19]

Sato et al.

[11] Patent Number: 4,716,084
[45] Date of Patent: Dec. 29, 1987

[54] OIL-IMPREGNATED CAPACITOR

[75] Inventors: Atsushi Sato, Tokyo; Shigenobu Kawakami, Ichikawa; Keiji Endo, Yokosuka; Hideyuki Dohi, Tokyo, all of Japan

[73] Assignee: Nippon Petrochemicals Company, Limited, Japan

[21] Appl. No.: 853,546

[22] Filed: Apr. 18, 1986

[30] Foreign Application Priority Data

Apr. 19, 1985 [JP] Japan .................................. 60-82178
Apr. 19, 1985 [JP] Japan .................................. 60-82179

[51] Int. Cl.$^4$ ............................................ B32B 15/08
[52] U.S. Cl. ...................................... 428/458; 428/421; 252/576; 252/574; 174/25; 361/324
[58] Field of Search ................ 252/576, 574; 428/458, 428/421; 361/324

[56] References Cited

U.S. PATENT DOCUMENTS 4,442,027 4/1984 Sato et al. ........................... 252/574
4,594,642 6/1986 Ito et al. .............................. 252/576

FOREIGN PATENT DOCUMENTS 1215001 12/1970 United Kingdom ................ 252/576
2032950 12/1983 United Kingdom .

*Primary Examiner*—Edith Buffalow
*Attorney, Agent, or Firm*—Scully, Scott, Murphy & Presser

[57] ABSTRACT

An oil-impregnated capacitor made by winding at least one plastic film impregnated with an electrical insulating oil comprising 1-phenyl-1-methylphenylethane in which 1-phenyl-1-(4-methylphenyl)ethane and 1-phenyl-1-(2-methyl)ethane are present in amounts of not less than 70 percent and not more than 15 percent, respectively, based on the total weight of the 1-phenyl-1-methylphenylethane.

9 Claims, No Drawings

OIL-IMPREGNATED CAPACITOR

BACKGROUND OF THE INVENTION

The present invention relates to an oil-impregnated capacitor. More particularly, it is concerned with a capacitor impregnated with aromatic hydrocarbons which contains 1-phenyl-1-methylphenylethane having a specific isomer ratio.

Heretofore there has been a keen demand for the reduction in size and increase in voltage of an oil-impregnated capacitor and various improvements have been made for electrical insulating materials which constitute an oil-impregnated capacitor, i.e., an impregnating electrical insulating oil and a dielectric.

For example, in British Pat. No.2032950 there is proposed an oil-impregnated capacitor impregnated with 1-phenyl-1-methylphenylethane. This oil-impregnated capacitor can somewhat satisfy the demand for the reduction in size and increase in voltage. But a further improvement has been desired. In this connection, it has recently been required for an oil-impregnated capacitor to have a low temperature characteristic; that is, an oil-impregnated capacitor is required to be capable of fully fulfilling its performance without breakdown even under application of a high voltage at a low temperature, for example, about −50° C. But the low temperature characteristic of the above-proposed oil-impregnated capacitor is not always satisfactory.

As the measure of improvement of the capacitor performance, a corona discharge start voltage (CSV) or a corona discharge extinction voltage (CEV) is measured, for example. However, the breakdown phenomenon of an oil-impregnated capacitor is extremely complex and difficult to clarify because of an interaction in affinity or permeability between an insulating oil and a dielectric under a high voltage in addition to the complexity peculiar to the breakdown phenomenon. Therefore, CSV or CEV cannot serve as the measure of the capacitor performance. The most reliable method is to actually prepare an oil-impregnated capacitor and measure its life. The improvement of the performance of an oil-impregnated capacitor must therefore be done in such a manner.

SUMMARY OF THE INVENTION

It is an object of the present invention to provide an oil-impregnated capacitor showing a superior performance even at a low temperature It is another object of the present invention to provide an oil-impregnated capacitor of a long service life having a longer breaking time, that is, capable of fully satisfying the demand for the reduction in size and increase in voltage.

The present invention resides in an oil-impregnated capacitor made by winding at least one plastic film impregnated with an electrical insulating oil comprising 1-phenyl-1-methylphenylethane in which 1-phenyl-1-(4-methylphenyl)ethane and 1-phenyl-1-(2-methylphenyl)ethane are present in amounts of not less than 70 percent and not more than 15 percent, respectively, based on the total weight of the 1-phenyl-1-methylphenylethane.

PREFERRED EMBODIMENTS OF THE INVENTION

Having made extensive studies for improving the performance of an oil-impregnated capacitor on the basis of actual machine tests, we found that an electrical performance of the capacitor was improved to a great extent by using an aromatic electrical insulating oil comprising 1-phenyl-1-methylphenylethane (hereinafter referred to as "PTE") having a specific isomer ratio.

It is necessary for the PTE to have the following isomer composition; not less than 70 wt.% (in PTE) of 1-phenyl-1-(4-methylphenyl)ethane (hereinafter referred to as "p-isomer") and not more than 15 wt.% (in PTE) of 1-phenyl-1-(2-methylphenyl)ethane (hereinafter referred to as "o-isomer"). The typical composition is 70–90 wt.% of p-isomer, 2–15 wt.% of o-isomer and 2–30 wt.% of m-isomer.

In the case where the isomer ratio in PTE is outside the range defined above, the objects of the invention will not be achieved.

The electrical insulating oil of the present invention may contain aromatic hydrocarbons other than the PTE.

The PTE content is preferably 30 to 100 wt.%, more preferably 30 to 80 wt.%, based on the total weight of the insulating oil.

The aromatic hydrocarbon preferably used in combination with the PTE in the present invention is an aromatic hydrocarbon having two condensed or noncondensed type aromatic rings, except PTE. Examples are diarylalkanes, alkylbiphenyls and alkylnaphthalenes.

As examples of diarylalkanes are mentioned 1-phenyl-1-(dimethylphenyl)ethane, 1,1-di(methylphenyl)ethane, 1-phenyl-1-ethylphenylethane, 1-phenyl-1isopropylphenylethane, 1-phenyl-2-isopropylphenylethane, diphenylmethane, methylphenyl-phenylmethane, di(methylphenyl)methane, dimethylphenyl-phenylmethane, ethylphenyl-phenylmethane, and isopropylphenylphenylmethane.

As examples of alkylbiphenyls are mentioned monoisopropylbiphenyl and diisopropylbiphenyl.

As examples of alkylnaphthalenes are mentioned monoisopropylnaphthalene and diisopropylnaphthalene.

The capacitor of the present invention is made by winding both a metallic foil such as an aluminum foil as an electrode and a plastic film to form a capacitor element and then impregnating it with an electrical insulating oil in a known manner.

As the plastic film there is used such a film as a polyester, polyvinylidene fluoride or polyolefin film. Preferred is a polyolefin film and particularly preferred is a polypropylene film. An insulating paper may be used together with the plastic film.

A metallized film capacitor made by winding a metallized plastic film with a metal such as zinc vapor-deposited thereon is also included in the present invention.

The oil-impregnated capacitor of the present invention can have a sufficiently long service life and fulfill a superior performance even at a temperature as low as −50° C.

The following examples are given to further illustrate the present invention.

EXAMPLE 1

Experiment-I

Two polypropylene films each 14 μ thick were put one upon another and the resulting laminate as a dielectric was wound together with a 7 μ thick aluminum foil as an electrode to obtain a capacitor element. The capacitor element was then impregnated in a known manner with each of the PTEs having various isomer ratios of o-, m- and p-isomers shown in Table 1, to prepare oil-impregnated capacitors each having a capacity of about 0.4 $\mu$F. Electrical characteristics of electrical insulating oils of various compositions are shown in Table 1, in which m-isomer means 1-phenyl-1-(3-methylphenyl)ethane.

The oil-impregnated capacitors thus obtained were each electrically charged at a potential gradient of 70 V/$\mu$ at a low temperature of −50° C., and the time until breakdown of each capacitor was determined. More specifically, with respect to one insulating oil there were prepared ten capacitors impregnated therewith and their breaking times were determined, then out of ten measured values obtained, the highest and lowest values were excluded and a mean value of the remaining eight measured values was used as a breaking time of the capacitor concerned. Results are as set out in Table 1.

trade name: TANATEX CG, product of SYBRON Co., Ltd.), diisopropylnaphthalene (DISN hereinafter, trade name: KIS-400, a product of Kureha Chemical Industry Co., Ltd.) and 1-phenyl-2-isopropylphenylethane (PIPE hereinafter, trade name: KIS-1000, a product of Kureha Chemical Industry Co., Ltd.), to prepare electrical insulating oils.

Two polypropylene films each 14 $\mu$ thick were put one upon another and the resulting laminate was wound together with a 7 $\mu$ thick aluminum foil as an electrode to obtain a capacitor element. The capacitor element was impregnated with each of the above electrical insulating oils in a known manner to obtain oil-impregnated capacitors each having a capacity of about 0.4 $\mu$F.

The oil-impregnated capacitors thus obtained were each electrically charged at a potential gradient of 70 V/$\mu$ at a low temperature of −50° C., and the time until breakdown of each capacitor was determined. More specifically, with respect to one insulating oil there

TABLE 1

| Insulating Oil No. | Isomer Composition Ratio (wt. %) | | | tan δ (%) | ε | ρ (Ω · cm) | BDV (KV/2.5 mm) | Breaking Time (hr) |
|---|---|---|---|---|---|---|---|---|
| | m-isomer | o-isomer | p-isomer | | | | | |
| 1 | 33.9 | 33.5 | 32.6 | 0.001 | 2.48 | $1.5 \times 10^{15}$ | 70 or more | 15 |
| 2 | 22.3 | 29.3 | 48.4 | " | " | $2.1 \times 10^{15}$ | " | 42 |
| 3 | 17.9 | 18.4 | 63.7 | " | 2.47 | $1.6 \times 10^{15}$ | " | 103 |
| 4 | 6.7 | 19.5 | 73.8 | " | " | $1.6 \times 10^{15}$ | " | 120 |
| 5 | 29.7 | 11.8 | 58.5 | " | 2.46 | $2.5 \times 10^{15}$ | " | 120 |
| 6 | 30.0 | 3.7 | 66.3 | " | " | $2.9 \times 10^{15}$ | " | 240 |
| 7 | 13.4 | 12.0 | 74.6 | " | 2.47 | $3.1 \times 10^{15}$ | " | 500 or more |
| 8 | 23.2 | 5.3 | 71.5 | " | " | $1.4 \times 10^{15}$ | " | " |
| 9 | 8.8 | 6.7 | 84.5 | " | " | $1.8 \times 10^{15}$ | " | " |
| 10 | 2.2 | 2.8 | 95.0 | " | 2.46 | $2.1 \times 10^{15}$ | " | " |

Experiment-II

Two polypropylene films each 18$\mu$ thick were wound together with aluminum foil in a known manner to obtain a capacitor element. The capacitor element was then impregnated with each of the insulating oils shown in Table 2 to prepare oil-impregnated capacitors each having a capacity of 10 $\mu$F.

The insulating oil Nos. 6 and 9 in Table 2 is the same as the insulating oil Nos. 6 and 9 in Table 1.

Then, the capacitors thus obtained were measured for CSV (unit: V/$\mu$) at −40° C. Results are shown also in Table 2.

Incidentally, the viscosity of PTE is changed according to isomer ratios. The viscosity of No.6 oil in Table 1 and 2, for example, 4.0 cst at 30° C.

TABLE 2

| Insulating Oil No. | Isomer Composition Ratio (wt. %) | | | CSV V/$\mu$, at −40° C. |
|---|---|---|---|---|
| | m-isomer | o-isomer | p-isomer | |
| 6 | 30.0 | 3.7 | 66.3 | 66 |
| 9 | 8.8 | 6.7 | 84.5 | 81 |
| 11 | 1-phenyl-1-xylylethane | | | 48 |

EXAMPLE 2

Preparation of Electrical Insulating Oil 40 wt.% of 1-phenyl-1-xylylethane (PXE hereinafter, trade name: HISOL SAS-10E, a product of Nippon Petrochemicals Co., Ltd.) was mixed with 60 wt.% of each of PTEs having various isomer ratios to prepare the electrical insulating oils shown in Table 3.

In Table 4, PTE having the same isomer ratio as that shown in No.6 in Table 3 was mixed in various ratios with PXE, monoisopropylbiphenyl (MIPB hereinafter, were prepared ten capacitors impregnated therewith and their breaking times were determined, then out of ten measured values obtained, the highest and lowest values were excluded and a mean value of the remaining eight measured values was used as a breaking time of the capacitor concerned.

Results are as set out in Tables 3 and 4.

TABLE 3

| No. | PTE Isomer Ratio (wt. %) | | | Breaking Time (hr) |
|---|---|---|---|---|
| | *m-isomer | o-isomer | o-isomer | |
| 1 | 33.9 | 33.5 | 32.6 | 35 |
| 2 | 22.3 | 29.3 | 48.4 | 80 |
| 3 | 17.9 | 18.4 | 63.7 | 92 |
| 4 | 13.4 | 12.0 | 74.6 | 480 |
| 5 | 23.2 | 5.3 | 71.5 | 480 |
| 6 | 8.8 | 6.7 | 84.5 | 510 |
| 7 | 2.2 | 2.8 | 95.0 | 550 |

*1-phenyl-1-(3-methylphenyl)ethane

TABLE 4

| Base Oil | | Breaking Time (hr) | | | |
|---|---|---|---|---|---|
| | | PXE | PIPE | MIPB | DISN |
| PTE Content (wt. %) | 0 | 10 | 10 | 10 | 7 |
| | 10 | 15 | 12 | 13 | 10 |
| | 20 | 17 | 15 | 14 | 12 |
| | 25 | 35 | 22 | 31 | 15 |
| | 30 | 200 | 160 | 170 | 20 |
| | 40 | 350 | 300 | 320 | 50 |
| | 50 | 430 | 400 | 410 | 120 |
| | 60 | 510 | 460 | 470 | 240 |

What is claimed is:

1. An oil-impregnated capacitor having at least one wound plastic film which is impregnated with an electric insulating oil, said insulating oil comprising 1-phenyl-1methylphenylethane wherein said 1-phenyl-1-methylphenylethane is present in 1-phenyl-1-(4-methylphenyl)ethane, 1-phenyl-1-(3-methylphenyl)ethane and 1-phenyl-1-(2-methylphenyl)ethane isomeric forms, said 1-phenyl-1-(4-methylphenyl)ethane form being present in an amount not less than 70 percent based upon the total weight of the 1-phenyl-1-methylphenylethane and said 1-phenyl-1-(2-methylphenyl)ethane form being present in an amount not more than 15 percent based upon the total weight of the 1-phenyl-1-methylphenylethane.

2. An oil impregnated capacitor as set forth in claim 1, wherein the content of said 1-phenyl-1methylphenylethane is at least 30 percent based on the weight of said electrical insulating oil.

3. An oil-impregnated capacitor as set forth in claim 1, wherein said 1-phenyl-1-methylphenylethane comprises 70–90 wt. % of 1-phenyl-1-(4-methylphenyl)ethane, 2–15 wt. % of 1-phenyl-1-(2-methylphenyl)ethane and 2–30 wt. % of 1-phenyl1-(3-methylphenyl)ethane.

4. An oil-impregnated capacitor as set forth in claim 1, wherein said insulating oil further comprises at least one aromatic hydrocarbon having two condensed or noncondensed aromatic rings other than said 1-phenyl-1-methylphenylethane.

5. An oil-impregnated capacitor as set forth in claim 4, wherein said aromatic hydrocarbon is a diarylalkane.

6. An oil-impregnated capacitor as set forth in claim 4, wherein said aromatic hydrocarbon is an alkylbiphenyl.

7. An oil-impregnated capacitor as set forth in claim 4, wherein said aromatic hydrocarbon is an alkylnaphthalene.

8. An oil-impregnated capacitor as set forth in claim 1, wherein said plastic film is a polyolefin film.

9. An oil-impregnated capacitor as set forth in claim 8, wherein said polyolefin film is a polypropylene film.

* * * * *